United States Patent
Song

(10) Patent No.: US 7,016,006 B2
(45) Date of Patent: Mar. 21, 2006

(54) LIQUID CRYSTAL DISPLAY

(75) Inventor: Jang-Kun Song, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 36 days.

(21) Appl. No.: 10/183,330

(22) Filed: Jun. 27, 2002

(65) Prior Publication Data

US 2003/0107696 A1 Jun. 12, 2003

(30) Foreign Application Priority Data

Dec. 7, 2001 (KR) ............................... 2001-77250

(51) Int. Cl.
*G02F 1/1343* (2006.01)

(52) U.S. Cl. ...................................... 349/146; 349/129
(58) Field of Classification Search ................ 349/129, 349/145, 146
See application file for complete search history.

(56) References Cited

U.S. PATENT DOCUMENTS

| | | | | |
|---|---|---|---|---|
| 4,776,673 A | * | 10/1988 | Aoki et al. | 349/47 |
| 6,172,729 B1 | * | 1/2001 | Ikeda | 349/145 |
| 6,449,025 B1 | * | 9/2002 | Lee | 349/129 |
| 6,462,798 B1 | * | 10/2002 | Kim et al. | 349/129 |
| 6,590,628 B1 | * | 7/2003 | Matsuoka et al. | 349/139 |

* cited by examiner

*Primary Examiner*—Robert Kim
*Assistant Examiner*—Richard H Kim
(74) *Attorney, Agent, or Firm*—F. Chau & Associates, LLC

(57) ABSTRACT

A gate line and a data line are formed on a first panel, a pixel electrode is divided into several small parts by an aperture, and a thin film transistor is formed on a pixel area defined by the intersection thereof. A common electrode having a domain dividing aperture and a data line aperture is formed on a second panel disposed opposite to the first substrate. Removing the common electrode from an upper side of the data line by forming the data line aperture as above can result in decreasing load of the data line, reducing a variation amount of liquid crystal capacitance, decreasing light leakage of due to side cross talk, and increasing an aperture ratio.

25 Claims, 12 Drawing Sheets

LIQUID CRYSTAL DISPLAY

BACKGROUND OF THE INVENTION (a) Field of the Invention

The present invention relates to a liquid crystal display, and in particular, to a vertical alignment type of liquid crystal display to implement a wide viewing angle by dividing a pixel area into a plurality of small domains using a domain dividing means.

(b) Description of the Related Art

Generally, a liquid crystal display ("LCD") includes an upper panel where a common electrode and a color filter are formed and a lower panel where a thin film transistor and a plurality of pixel electrodes are formed with a liquid crystal material interposed therebetween. An LCD is a display device that displays desired images by applying electric fields to the liquid crystal layer to control the amount of light passing through the panels.

A plurality of wires including a gate wire for transmitting scan signals and a data wire for transmitting image signals are formed on the thin film transistor panel, and these wires have a self-resistance and a capacitance by coupling with a surrounding wire or the common electrode of the upper panel. The self-resistance and capacitance work as a load on each wire and distort signals transmitted via the wires due to resistive-capacitive ("RC") delay. In particular, a coupling of data lines and the common electrode drive the liquid crystal material therebetween to cause light leakage surrounding the data lines, thereby degrading image quality. In addition, forming a black matrix widely in order to prevent light leakage tends to decrease the aperture ratio.

SUMMARY OF THE INVENTION

Embodiments of the present invention decrease a load for a data wire to improve image qualities. Embodiments of the present invention decrease light leakage surrounding a data wire by decreasing a capacitance due to coupling between a data wire and a common electrode.

In these and other embodiments, an aperture is formed in a common electrode area overlying data lines in the present invention. A liquid crystal display is formed, including a first insulating substrate, a first wire formed on the first substrate, a second wire formed on the first substrate and insulated with and intersecting the first wire, a pixel electrode formed on each of a plurality of pixel areas defined by intersection of the first wire and the second wire and divided into several small parts by a first domain dividing means, a thin film transistor connected to the first wire, the second wire and the pixel electrode, a second insulating substrate disposed opposite to the first substrate, and a common electrode formed on the second substrate and having a second dividing means dividing the pixel electrode into several small domains together with the first dividing means and having a second wire aperture overlapping the second wire.

Here, the first domain dividing means may be an aperture belonging to the pixel electrode and the second domain dividing means may be an aperture belonging to the common electrode, and it is preferable that the second domain dividing means and the second wire make a 180 degree rotation symmetry between two pixel areas neighboring and interposing the second wire. In addition, the second domain dividing means includes a left and right domain dividing means for dividing the pixel electrode into left and right and an above and below domain dividing means for dividing the pixel electrode into above and below, and the second wire aperture is connected to both ends of the above and below domain dividing means. In addition, a space between the two neighboring second wires is varied repeatedly by a specific length, and sides adjacent to the second wire of the pixel electrode are bent with the pattern of the second wire to make the pixel electrode have a narrow width and a wide width.

Alternately, a liquid crystal display is formed including a first insulating substrate, a gate wire including a gate line formed extending in a transverse direction on the first substrate and a gate electrode connected with the gate line, a gate insulating layer formed on the gate wire, a channel portion semiconductor layer formed on the gate insulating layer over the gate electrode, an ohmic contact layer formed on the channel portion semiconductor layer and divided into both sides centering around the gate electrode, a data wire including a source electrode and a drain electrode formed on the ohmic contact layer and a data line connected with the source electrode, a passivation layer formed on the data wire and a contact hole for exposing the drain electrode, a pixel electrode formed on the passivation layer and connected with the drain electrode through the contact hole, and comprising several small parts and a connecting portion for connecting the small parts, a second insulating substrate disposed opposite to the first substrate, a color filter formed on the second substrate, and a common electrode covering the color filter and having a dividing aperture dividing the respective small parts of the pixel electrode into small domains and a data line aperture extending along the data line on the data line.

In this case, the liquid crystal display further includes a storage capacitor wire formed in the same layer as the gate wire on the first substrate, and it is preferable that the respective small parts of the pixel electrode have longer sides and shorter sides parallel with the gate line or the data line, and that the storage capacitor wire is disposed among the data line and the longer sides of the respective small parts adjacent thereto, and that the storage capacitor wire overlaps the shorter sides of the respective small parts of the pixel electrode adjacent to the data line, and that the dividing aperture and the data line aperture make 180 degree rotation symmetry with each other between the two pixel areas neighboring and interposing the data line. In addition, it is preferable that a space between the two neighboring second wires is varied repeatedly by a specific length, and sides adjacent to the second wire of the pixel electrode are bent with the pattern of the second wire to make the pixel electrode have a narrow dimension and a wide dimension.

DETAILED DESCRIPTION OF THE PREFERRED EMBODIMENTS

Preferred embodiments of the present invention will be described below with reference to drawings. The terms "aperture" and "open portion" are used with the same meaning in the following description.

Figure 1:
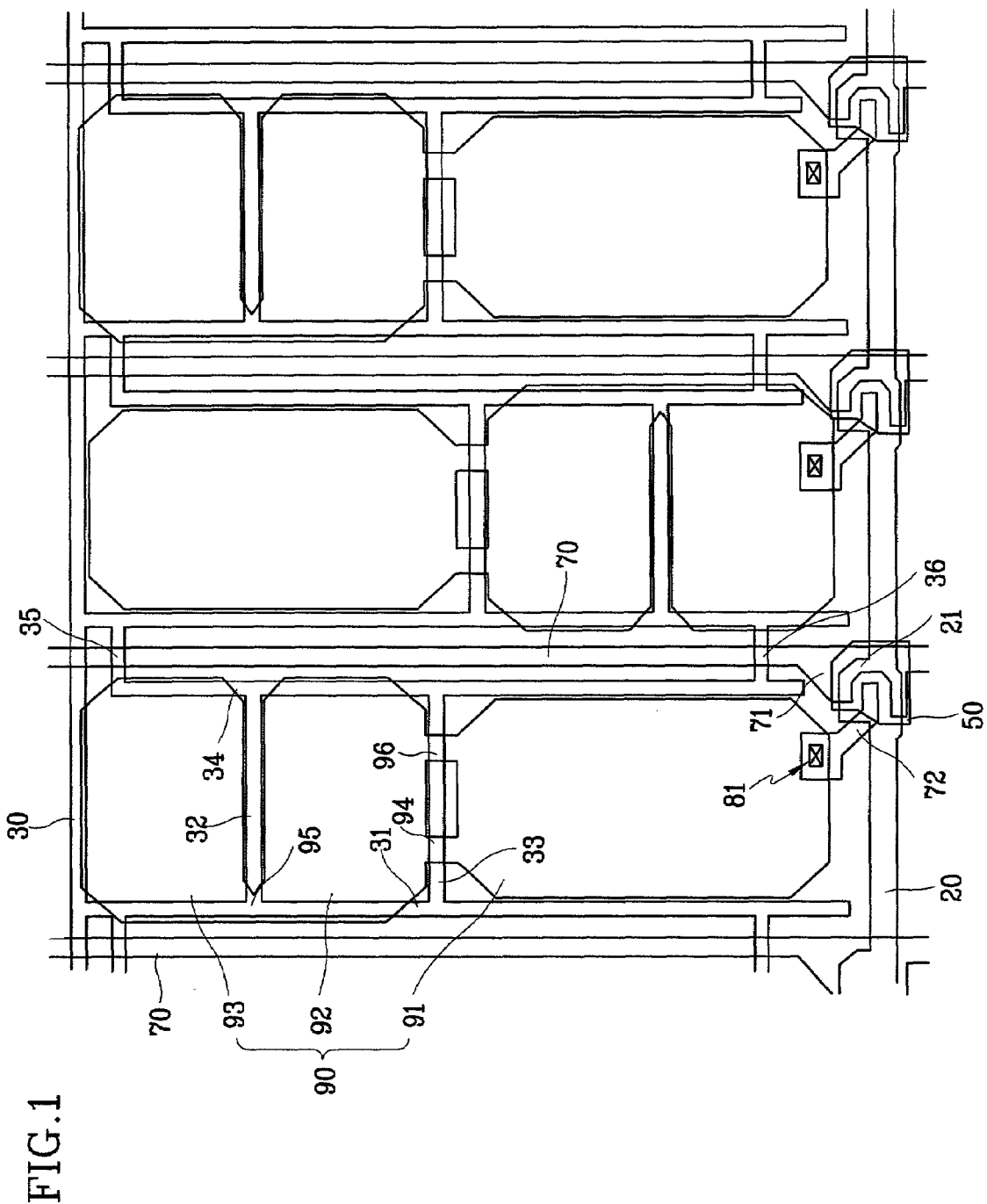
FIG. 1 is a layout of a thin film transistor for an LCD according to a first embodiment of the present invention.
Figure 2:
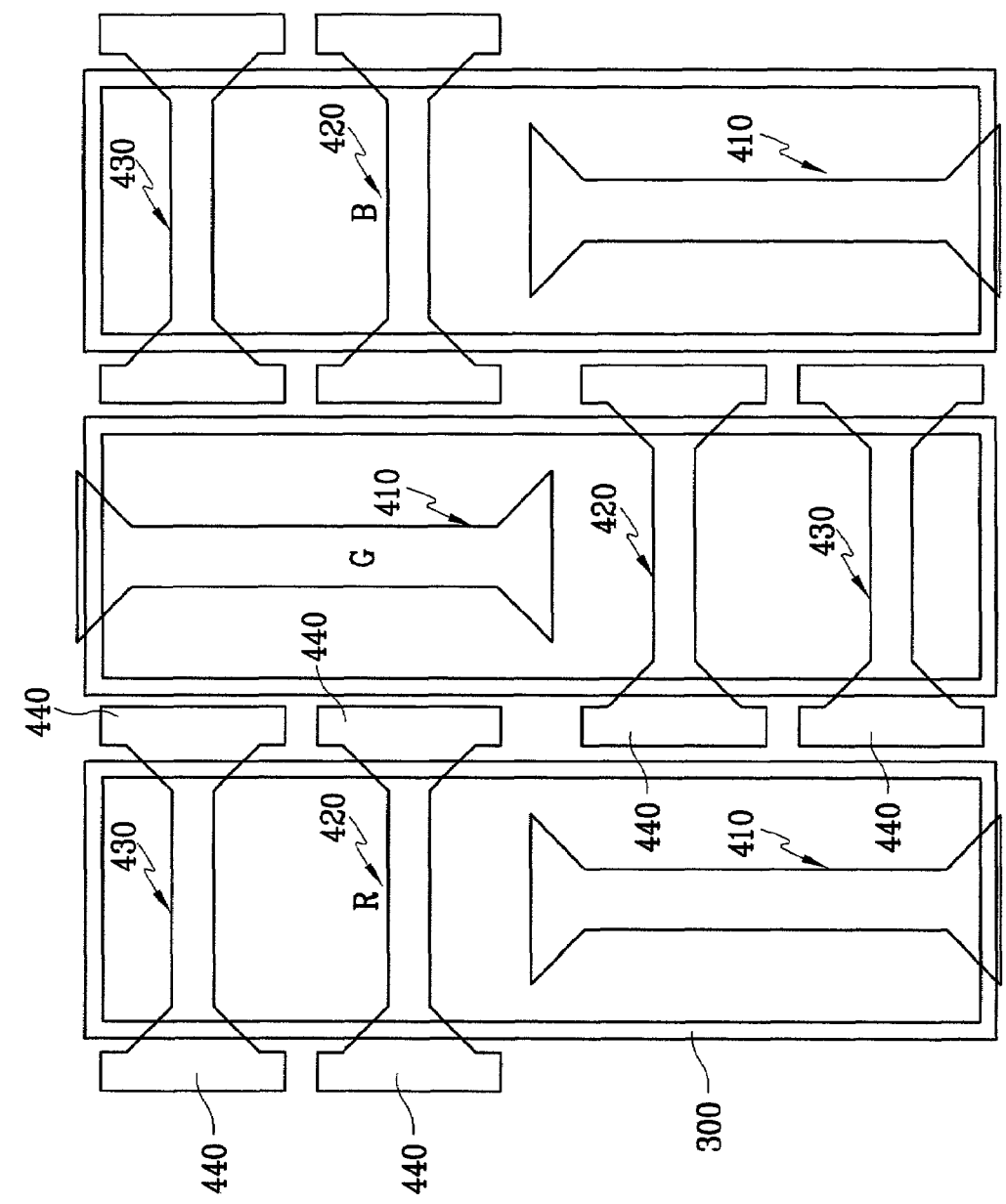
FIG. 2 is a layout of a color filter panel of an LCD according to a first embodiment of the present invention.
Figure 3:
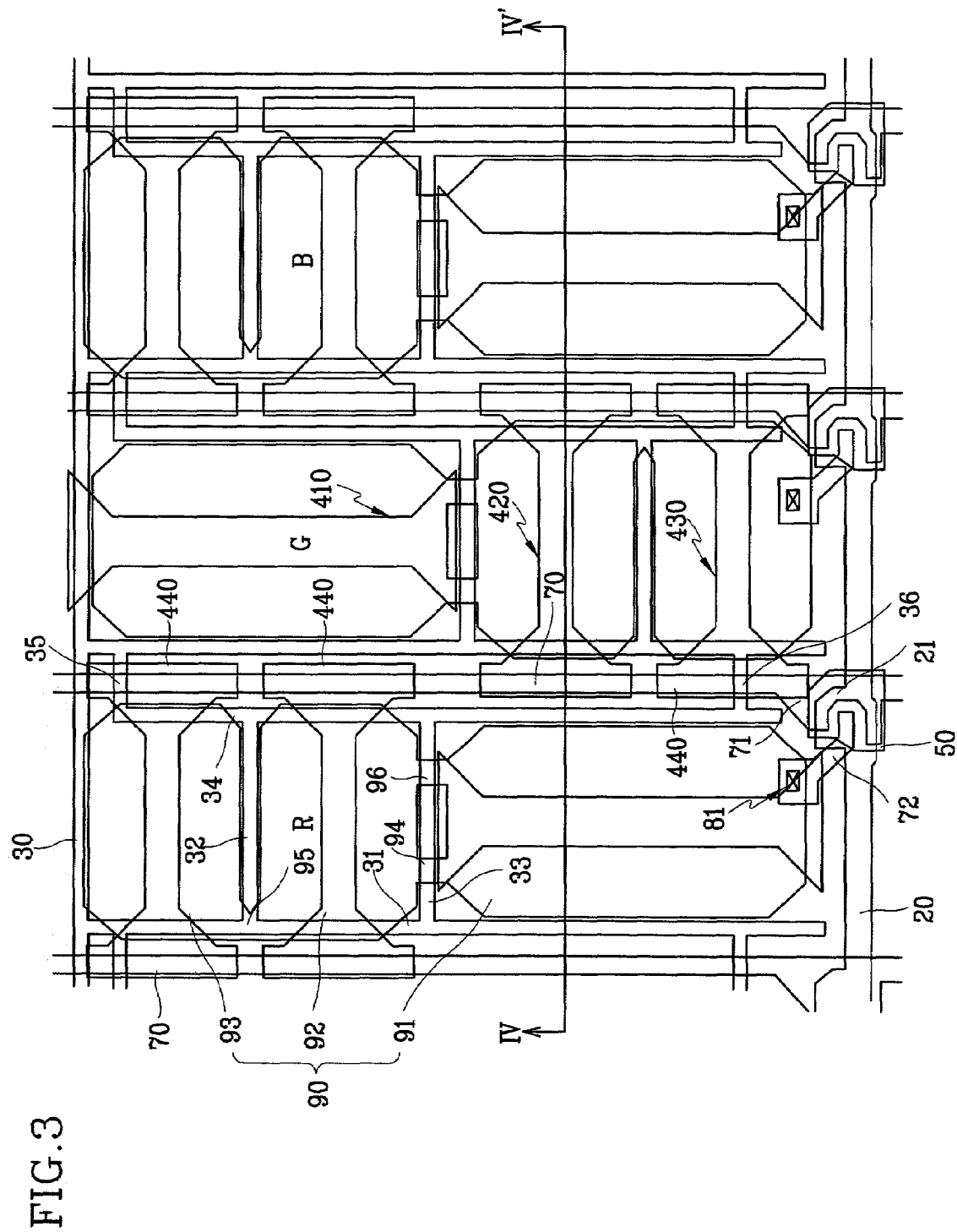
FIG. 3 is a layout of a pixel electrode and a common electrode aperture when an LCD of a first embodiment of the present invention is seen at the front side.
Figure 4:
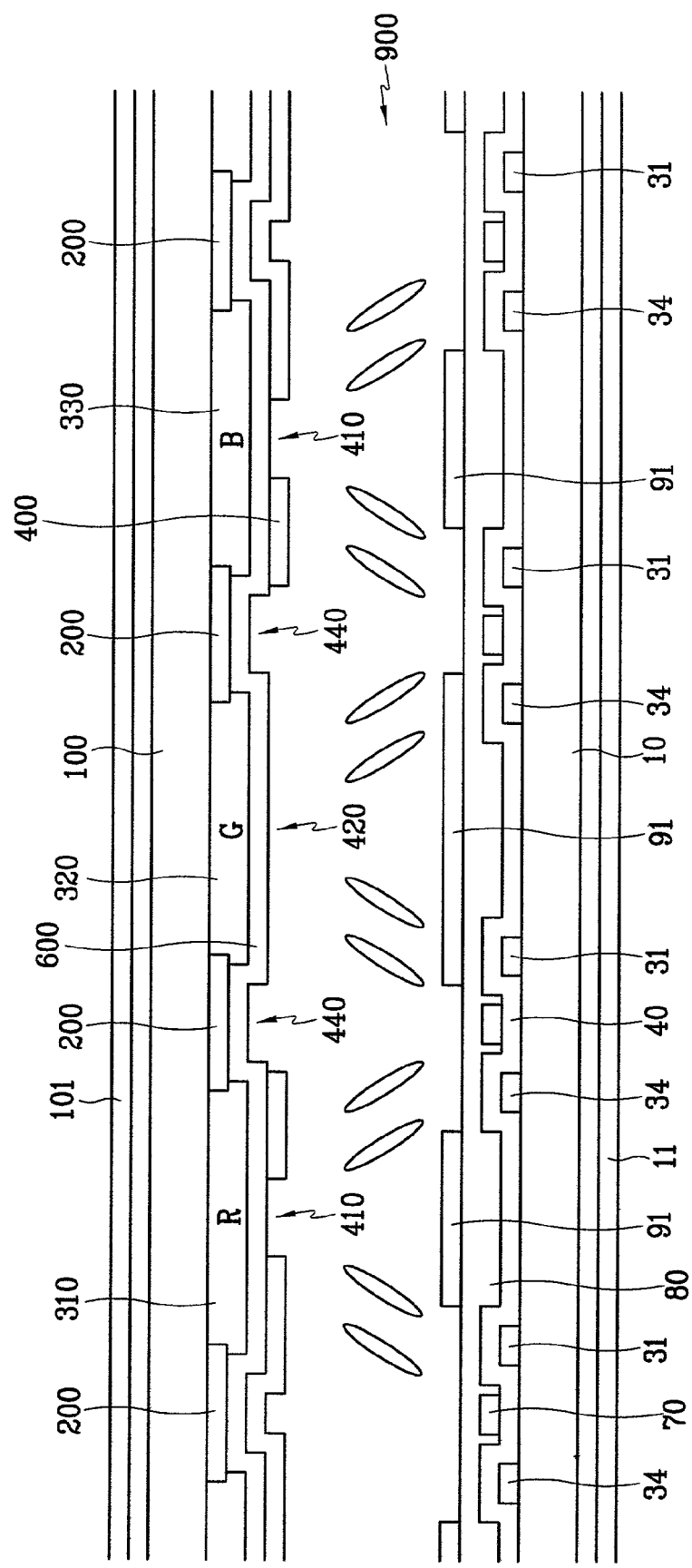
FIG. 4 is a cross sectional view taken along line IV–IV' shown in FIG. 3.

FIG. 1 is a layout of a thin film transistor for an LCD according to a first embodiment of the present invention, FIG. 2 is a layout of a color filter panel of an LCD according to a first embodiment of the present invention, FIG. 3 is a layout of a pixel and a common electrode aperture when an LCD of a first embodiment of the present invention is seen in the front side, and FIG. 4 is a cross sectional view taken along line IV–IV' shown in FIG. 3.

First, a thin film transistor of an LCD according to a first embodiment of the present invention is described with reference to FIG. 1 and FIG. 4. A plurality of gate lines extending in a transverse direction formed on an insulating substrate 10, and the storage capacitor line 30 is formed parallel therewith. Several gate electrodes are formed as a projection shape on the gate lines and a first to a fourth storage electrode 31, 32, 33 and 34 and storage electrode connectors 35 and 36 on the storage capacitor line 30. Here, the first storage electrode 31 is directly connected to the storage capacitor line 30 to extend in a longitudinal direction, and each of the second and the third storage electrodes 32 and 33 are connected to the first storage electrode 31 to extend in a transverse direction. The fourth storage electrode 34 is connected to the second and the third storage electrodes 32 and 33 to extend in a longitudinal direction. The storage electrode connectors 35 and 36 connect the fourth storage electrode 34 with the first storage electrode 31 in the neighboring pixel.

A gate insulating layer 40 is formed on the gate wires 20 and 21 and the storage capacitor wires 30, 31, 32, 33, 34, 35 and 36, and a semiconductor layer 50 made of an amorphous silicon is formed on the gate insulating layer over the gate electrode 21. Ohmic contact layers made of amorphous silicon of doping N type such as P with high concentration are formed on the semiconductor layer 50. A source electrode 71 is formed on both the ohmic contact layers, which is connected to the data lines 70 extending in a longitudinal direction. A passivation layer having a contact hole 81 for exposing a drain electrode 72 is formed on the data wires 70, 71 and 72, and a pixel electrode connected to the drain electrode 72 via the contact hole 81 is formed thereon. The pixel electrode 90 is made of a transparent conductive material such as indium tin oxide ("ITO") or indium zinc oxide ("IZO").

The pixel electrode 90 is divided into a first to a third small part 91, 92 and 93, and these small parts are connected with each other via connectors 94, 95 and 96. The first small part 91 is formed in a rectangular shape with four edges cut (hereinafter, referred to as "edge-cut") on a upper or lower half side of a pixel area defined by intersection of two gate lines 20 and two data lines 70, and the second and the third small parts 92 and 93 are also formed in a rectangular shape with four edges cut on the other half side of the pixel area. The second small part 92 is connected with the first part 91 via the first and second connectors 94 and 96, and the third part 93 is connected with the second part 92 via the third connector 95.

Here, the second storage electrode 32 is disposed between the third small part 93 and the second small part 92, and the third storage electrode 33 is disposed between the second small part 92 and the first small part 91, and the first storage electrode 31 and the fourth storage electrode 34 are disposed between the pixel electrode 90 and the data lines 70. A side parallel with the data lines is longer than that parallel with the gate lines in the first part, and sides parallel with the data lines are shorter than that parallel with the gate lines in the second and the third parts. Here, the second and the third small part 92 and 93 overlap the first and the fourth storage electrode 31 and 34 but the first small part 91 does not overlap the first and the fourth storage electrodes 31 and 34.

In this case, the pixel electrode 90 is aligned in a form of reversing upper and lower sides in the two neighboring pixel areas interposing the data lines 70. Accordingly, in drawings, the first small part 91 is disposed in a lower half plane in the first pixel area but is disposed in an upper half plane in the second pixel area. Following this, the position of the second and the third storage electrodes 32 and 33 are also reversed in the two neighboring pixel areas interposing the data lines 70. However, in the case of a thin film transistor, thin film transistors pertaining to a pixel area in the same row are connected to the same gate lines. Therefore, a drain electrode 72 of the thin film transistor is connected to the first small part 91 in the first pixel area yet is connected to the third small part 93 in the second pixel area. In the meantime, the storage capacitor line 30, the storage electrodes 31, 32, 33 and 34 and the storage capacitor connectors 35 and 36 are generally applied with a voltage applied to a common electrode of a color filter panel described later.

As above, when the storage capacitor lines or the storage electrodes applied with the common voltages are disposed between the pixel electrodes and between the gate lines and the pixel electrodes, it is possible to form stable small domains by the storage capacitor lines and the storage electrodes blocking influences of the data line voltages and the gate line voltages to an electric field of the pixel areas.

Next, a color filter panel 300 of an LCD according to a first embodiment of the present invention will be described with reference to FIG. 2 and FIG. 4. A plurality of black matrices formed as double layers of Cr/CrOx are formed on a transparent substrate 100 made of glass to define pixel areas. Color filters 310, 320 and 330 of red R, green G and blue B are formed in respective pixel areas. An overcoat covers the color filters 310, 320 and 330 to protect them, and a common electrode 400 made of a transparent conductor is formed on the overcoat. Aperture patterns 410, 420 and 430 comprise a first to a third aperture 410, 420 and 430.

The first aperture 410 divides the upper side or the lower side of the pixel area into both sides of the left and right sides, and the second aperture 420 and the third aperture 430 divide the remaining pixel area into three parts above and below. Both ends of respective apertures 410, 420 and 430 gradually extend to form an isosceles triangle shape, and especially, the second and the third apertures 420 and 430 are connected with the data lines overlapping the black matrices 200 between the pixel areas from an outside of the isosceles triangle. The first to the third aperture 410, 420 and 430 and the data line aperture 440 is disposed in a form reversing above and below in the two pixel areas neighboring in left and right side.

In the meantime, the black matrix 200 may be made of an organic insulating material adding black colors instead of metal materials such as Cr and the like. Aligning and combining the thin film transistor panel of FIG. 1 and the color filter panel of FIG. 2, and then injecting the liquid crystal material 900 between the two panels to align longer axis of the liquid crystal molecules therein vertically, and disposing the polarization axes of the polarizers 11 and 101 crossing vertically, forms the LCD according to the first embodiment.

In the aligning state of two panels 10 and 100, the small parts 91, 92 and 93 of the pixel areas of the thin film transistor and the first to the third apertures 410, 420 and 430 formed on the common electrode of the color filter panel overlap to divide the pixel areas into several small domains. Each domain has two longer sides and two shorter sides, which has a long shape in a parallel direction with data lines 70 or the gate lines 20.

Meanwhile, the respective small parts 91, 92 and 93 of the pixel electrode 90 comprise two longer sides and two shorter sides, and the longer side of each small part is substantially parallel with the gate line and makes about a 45 degree angle with the polarization axis of the polarizer. Here, when the longer sides of the small parts 91, 92 and 93 of the pixel electrode 90 are disposed adjacent to the data lines 70 and the gate lines 20, the storage capacitor line 30 or the storage capacitor 31, 32, 33 and 34 is disposed between the data lines and the longer sides and between the gate lines and the longer sides.

On the other hand, the storage capacitor wire 30, 31, 32, 33 and 34 is not disposed on the surrounding of the shorter sides of the respective small parts 91, 92 and 93, and it is preferable that, if disposed, it is covered with the pixel electrode 90 or is apart more than 3 m from the pixel electrode 90. The reason for disposing the storage capacitor wires 30, 31, 32, 33 and 34 as above is that the voltages of the data lines 70 and the data lines 20 adjacent to the longer sides of the small parts 91, 92 and 93 of the pixel electrode work in a direction of hindering formation of domain, and in contrast, these work in a direction of helping formation of domain.

In addition, since the data line apertures 440 belonging to the common electrode 400 overlap the data lines, the area of the common electrodes 400 overlapping the data lines is much decreased. As above, decreasing the area of the common electrode overlapping the data lines 70 enables loads of the data lines to decrease, and an amount of the variation of the liquid crystal capacitance in the data lines 70 to decrease, and side light leakage due to cross talk of data lines signals to decrease. In addition, since the light leakage surrounding the data lines is considerably decreased, the aperture ratio increases due to a decrease of the black matrix.

The effect of disposing such data lines apertures 440 will be described more in detail after a second embodiment of the present invention is described.

Figure 5:
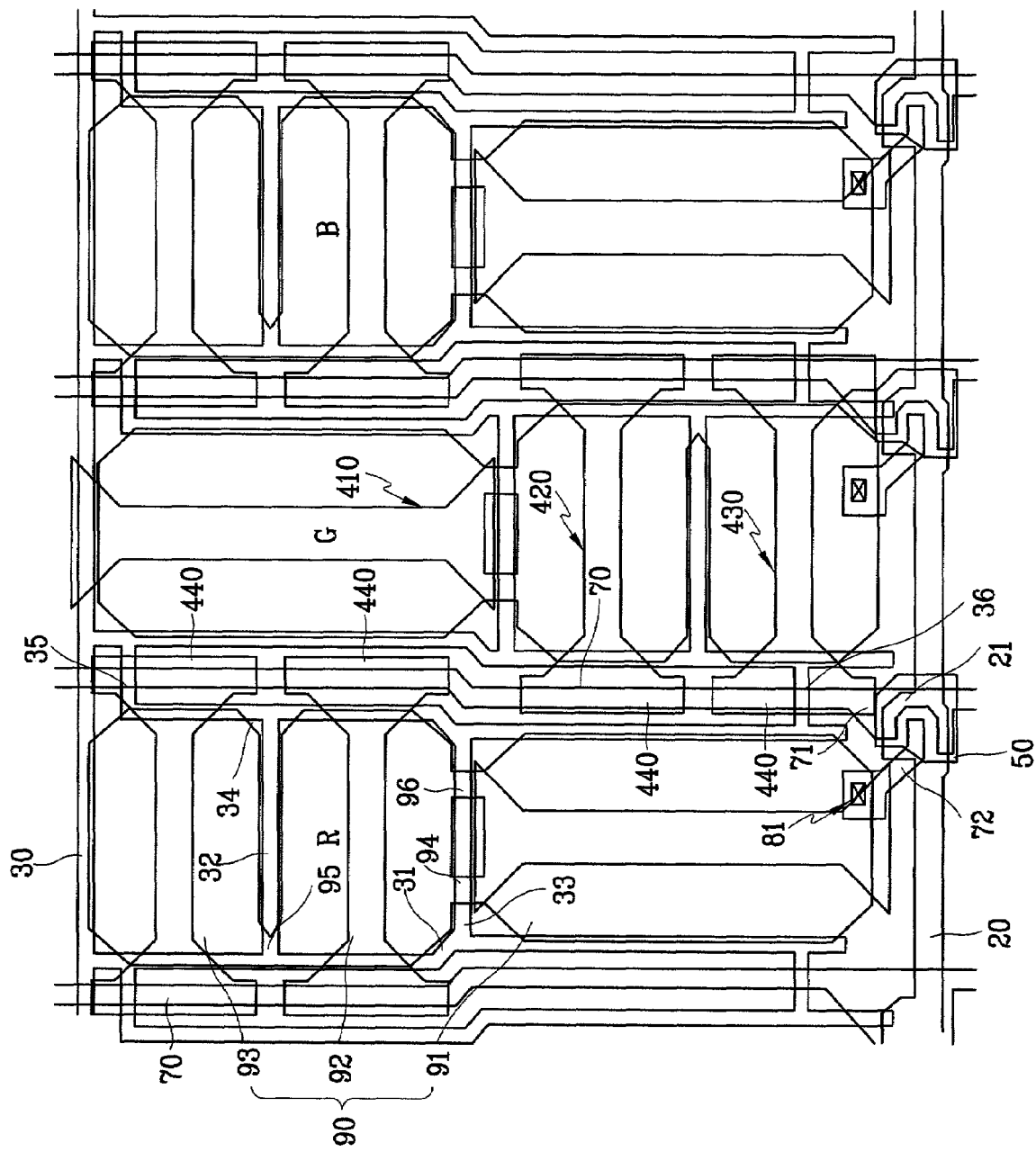
FIG. 5 is a layout of a pixel electrode and a common electrode aperture when an LCD of a second embodiment of the present invention is seen at the front side.

FIG. 5 is layout of pixel electrode apertures and common electrode apertures according to a second embodiment of the present invention when viewed from the front. The LCD according to the second embodiment of the present invention is the same as the first embodiment except that the shapes of the pixel electrode are changed to have a wide portion and a narrow portion. That is, the data lines 70 are aligned missed in left and right alternately centering around a vertical straight line in a longitudinal direction. The distance missed in left and right is preferably within 3 m–20 m. Here, areas formed in the two neighboring data lines 70 show alternating wide and narrow areas, respectively. This is the same in both left and right and above and below. The first and the fourth storage electrodes 31 and 34 are also bent with the same pattern as the data lines, and the pixel electrode 90 is transformed according to a shape of the pixel area transformed by the data lines. That is, left and right width of the first pixel area 91 is reduced relative to the first embodiment, and that of the second and the third small parts 92 and 93 is enlarged relative thereto. Hereinafter, a pixel of such a shape is referred to as a "bottle shaped" pixel.

In addition, alignment of the apertures 410, 420 and 430 belonging to the common electrode 400 is transformed. That is, since the length of the second and the third apertures 420 and 430 is enlarged in left and right, the data line apertures 440 are aligned not in a straight but missed in left and right slightly. This is on purpose for aligning the data lines aperture 440 in order to overlap the data lines 70 bent in left and right.

When the apertures 410, 420 and 430 to divide the pixel electrode 90 and domain into shapes as above, it is possible to increase the aperture ratio to the maximum by adjusting the width of domains in a transverse and a longitudinal direction. In addition, as in the first embodiment, by reducing areas of the common electrode 400 overlapping the data lines, loads of the data lines 70 decrease, and a variation of the liquid crystal capacitance developed in the data lines 70 decreases, and a light leakage of side due to cross talk of the data lines signals decreases. In particular, in case the data lines are bent in left and right as in the second embodiment, since the length thereof is longer relative to the shape of a straight line, there may be problems of signal torsion and a light leakage of side due to self loads of the data lines. However, it is possible to solve such problems by disposing the data line apertures 440. In addition, in a structure of the bottle shape, a shape of the neighboring pixel areas is formed with 180° rotation symmetry, and this alignment of the 180° rotation symmetry enables the data line apertures 440 to be aligned in a wider area overlapping the data lines.

Next, the above effect obtained by forming the data line apertures 440 will be described in detail. First, the decrease of loads of the data lines will be examined.

Figure 6:
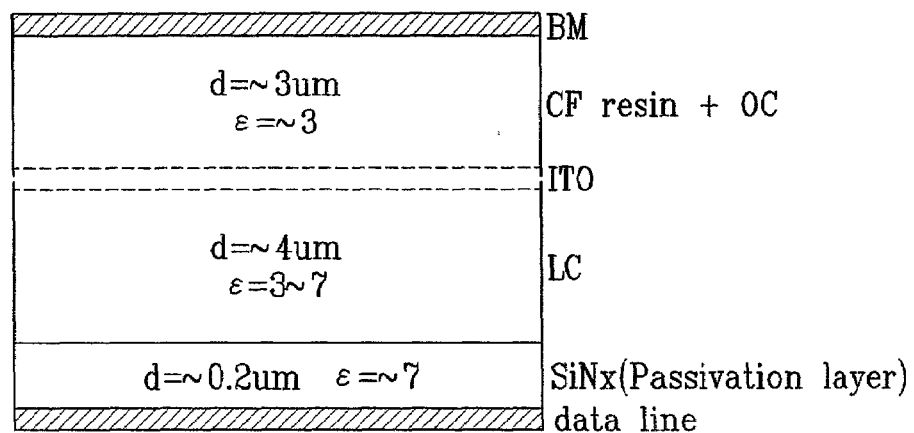
FIG. 6 is a drawing schematically showing a cross sectional structure of an LCD in order to explain a load for a wire in the LCD.

FIG. 6 is a diagram illustrating the structure of the cross section schematically to explain loads the data lines in the LCD. For capacitances developed in the data lines, it is estimated that 50% thereof is formed by coupling with the other lines and the other 50% thereof is formed by coupling with the common electrode 400 of the opposite panel. Here, when the data line apertures are aligned as in FIG. 5, the common electrodes 400 are removed from the overlapping area of 70%–80% of the total length of the data lines. With this, 70%–80% of 50% capacitance formed by coupling with the common electrodes 400 may be regarded to decrease.

However, when the black matrix is made of Cr, even though ITO is removed, the decrease of the capacitances is reduced due to existence of capacitance with the black matrix ("BM").

For the cases when an ITO layer corresponding to the common electrode exists and when it does not, capacitances formed between the data line and the ITO layer are calculated schematically. First, when the ITO layer exists, since voltage developed in the liquid crystal layer LC is at a maximum, a dielectric constant of the liquid crystal is varied from 3 to 7. Thus, disregarding the passivation layer, the capacitance will be A×3/4=0.75 A in the case of the minimum of the dielectric constant, and A×7/4=1.75 A in the case of the maximum of the dielectric constant. That is, the capacitive loads of the data lines due to the common electrodes are in a range of 0.75 A–1.75 A in the presence of the ITO layer.

Since voltage developed in the liquid crystal layer LC is about half of the total in non-existence of the ITO layer, the dielectric constant is 3–4, and since the capacitances are formed between the black matrices BM and the data line, d is 7. Accordingly, the capacitance will be A×4/7=0.57 A for the case of the maximum of the dielectric constant, and A×3/7=0.43 A for the minimum of the dielectric constant.

Thus, taking the mean value, the value of capacitance between the data line and the CF is (0.43+0.57)/(0.75+1.75) =0.4. This is reduced to 40% relative to the non-existence of the ITO layer. The load of a data line according to embodiments of the present invention is represented by a relative ratio in the following table, referring to conventional loads of the data line, and summarizing the above results.

TABLE I

| A kind of BM | Conventional structure | The structure of the first and the second embodiment of the present invention |
|---|---|---|
| Organic BM | 1 | 0.5 (the other lines) + 0.5 × 0.25 (remaining ITO portion) = 0.63 |
| Cr BM | 1 | 0.5 (the other lines) + 0.5 × 0.25 (the remaining ITO portion) + 0.5 × 0.73 × 0.4(BM) = 0.78 |

As can seen in Table 1, the capacitive load of the data line is decreased by nearly 40% for the use of organic BM, and by over 20% even for the use of Cr BM.

Next, the decrease of cross talk problem in a longitudinal direction will be examined. Here, the problem of charging ratio is decreased due to a decrease of the load of the data lines as described above. However, even though the charging ratio is the same level, the cross-talk problem generated by lack of the charging ratio is more decreased in the present invention than under the prior art. This is because the voltage developed in the surrounding liquid crystal is much decreased by removing the common electrode from the data lines, and accordingly, the movement of the liquid crystal is reduced to decrease the variation amount of the load developed in the data line. In the variation amount of the load developed in the data lines, 1.0 A is varied from 0.75 A to 1.75 A for the existence of common electrode (ITO layer). However, just 0.07 A is varied from 0.43 A to 0.50 A for the non-existence of the common electrode. Even considering coupling the data wire with the other wire, the variation of the capacitive load due to the variation of the movement of the liquid crystal is decreased below 15% relative to the prior art. This is an advantageous level, solving problems generated in high-resolution products to an extent.

Next, the decrease of light leakage due to side cross talk will be examined. Removing the common electrode from the upper side of the data line weakens an electric field generated between the data line and the common electrode. Thus, the lying angle of the liquid crystal driven is decreased due to influences of signal transmissions along the data line in the surroundings thereof, and this causes the amount of light leakage to be decreased. This is seen through a simulated graph.

Figure 7:
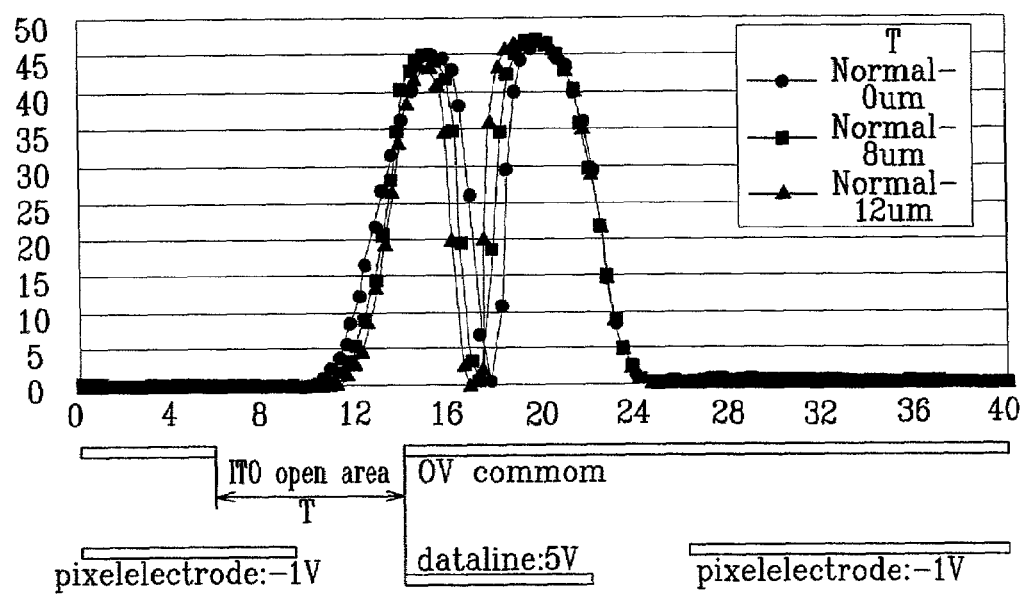
FIG. 7 is a graph showing the degree of light leakage surrounding a data wire in an LCD according to prior art.
Figure 8:
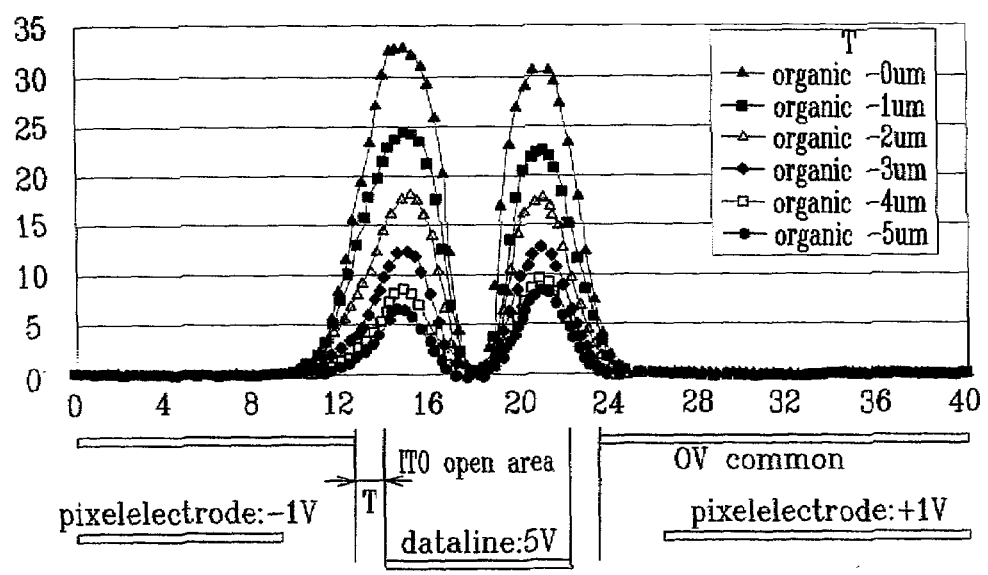
FIGS. 8 and 9 are graphs showing the degree of light leakage surrounding a data wire in an LCD according to embodiment of the present invention, and show the cases of forming a black matrix with an organic material and Cr, respectively.
Figure 9:
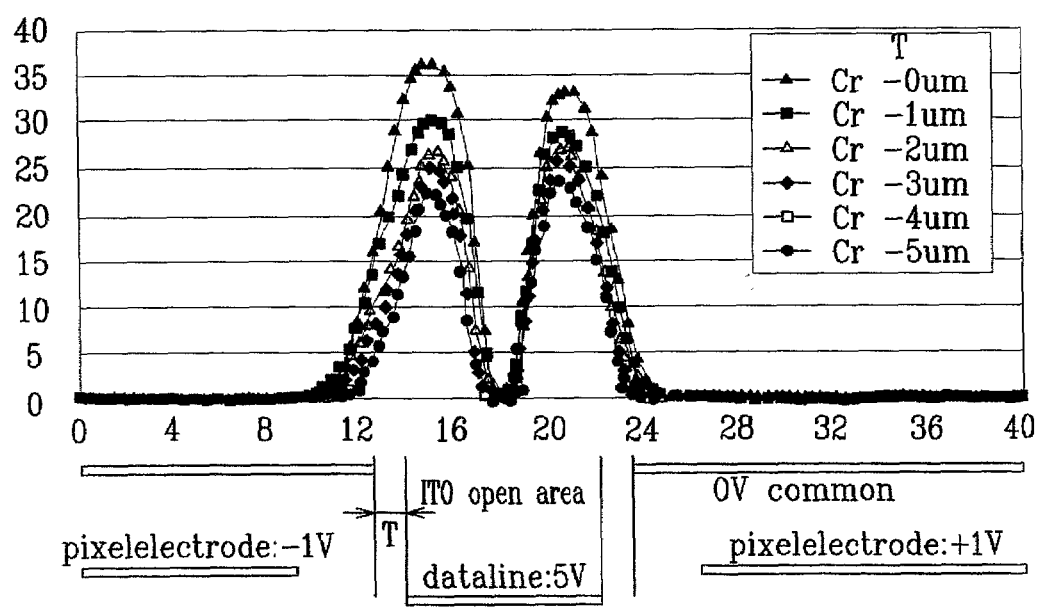

FIG. 7 is a graph showing a degree of light leakage in the surrounding of the data line in an LCD according to the normal prior art. FIGS. 8 and 9 are graphs showing the degree of light leakage in the surroundings of the data line in an LCD according to present invention, which show a black matrix made of an organic material and Cr, respectively.

FIGS. 7 to 9 are simulated graphs in a state of applying 0V to the common electrode and 5V to the data line, and –1V and 1V to left and right pixel electrodes, respectively.

Referring to FIG. 7, the common electrode in an area beyond the data line is open. The numeral values described in the legend of the graph correspond to the widths of the portion where the common electrode ITO is open in a layout of electrodes depicted under the graph. As shown in the graph, it can be seen that almost similar light leakages are generated regardless of the widths of the open portion. That is, it does not contribute in decreasing the light leakage to dispose the common electrode in an area beyond the data line.

Next, seeing FIGS. 8 and 9, the common electrode is open on the data line. T as described in the legend of the graph represents the widths of the open portion beyond the width of data line in a layout of electrodes depicted under the graph. In the graph, it can be seen that, as the width of the open portion of the common electrode is increased, the degree of the light leakage is decreased, both for the use of organic BM and for the use of Cr BM. This shows the possibility of decreasing the light leakage of side in the surrounding of the data line by opening the common electrode on the data line.

Figure 10:
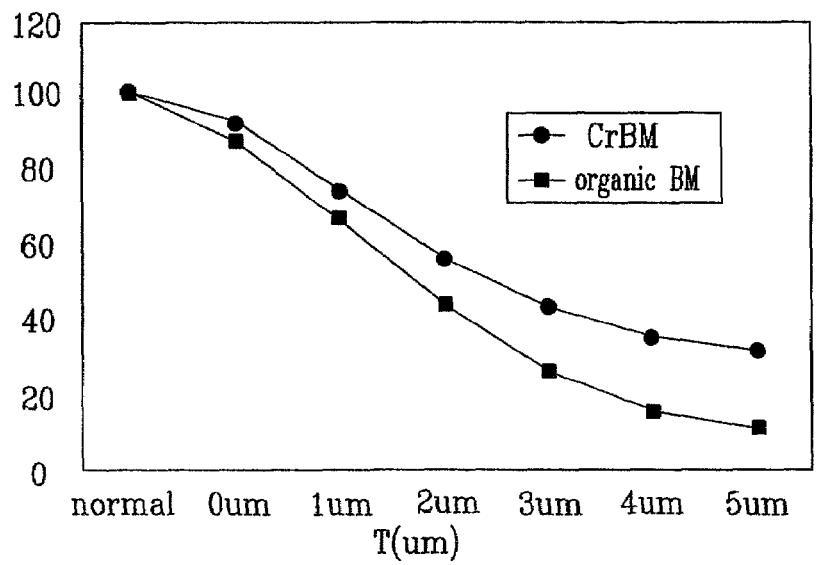
FIG. 10 is a graph comparing the degree of light leakage surrounding a data wire depending on upper aperture widths in an LCD according to embodiments of the present invention with that of an LCD according to prior art.

FIG. 10 is a graph comparing the degree of light leakage in the surroundings of the data line depending on the open width on the data line in the LCD according to present invention with that in an LCD according to the prior art. FIG. 10 illustrates by a comparison the amount of the light leakage depending on the increase of T value, making reference 100 to conventional prior art structure ("normal"), as integrating an amount of the light leakage.

In FIG. 10, it can be seen that, as the T value increases, the amount of light leakage decreases. This means that the open portion of the common portion can decrease the cross talk of the side. Meanwhile, the range of decrease of an amount of the light leakage is larger in use of Cr BM than in the use of organic BM. The reason is that Cr BM forms an electric field between the data lines by working as an electrode even though the common electrode is removed.

It is possible that, in FIG. 5, the widths of apertures 440 extend widely enough to the second and the third portions 92 and 93, and extend to 4 m beyond the data line to the first small part 91 of the neighboring pixel. This enables the light leakage to the second and the third small parts 92 and 93 to be reduced 30% below that relative to the prior art, and to another part to reduce 50% below thereof.

Figure 11:
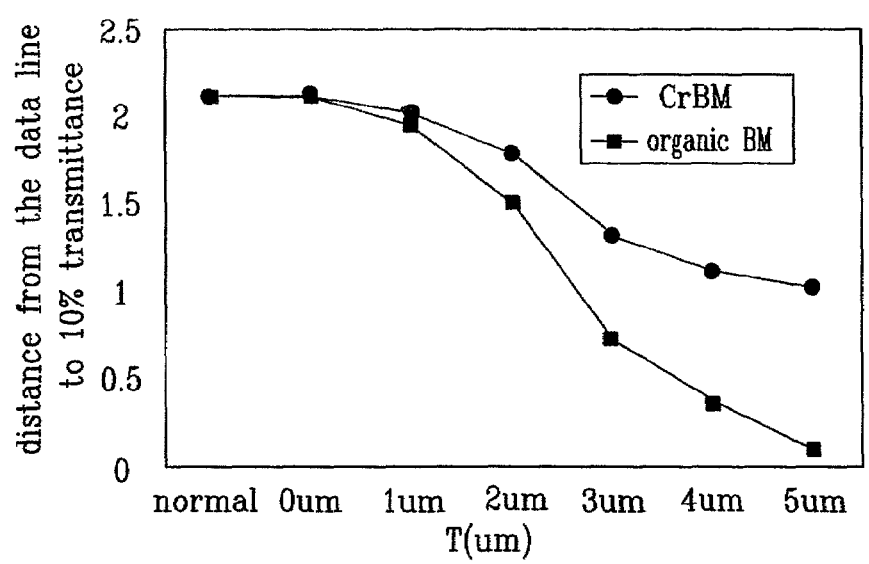
FIG. 11 is a graph comparing distance from the point showing 10% of transmittance to the data line depending on the width of aperture on the data line in the LCD according to embodiments of the present invention with that in an LCD according to prior art.

Next, the increase of the aperture ratio will be described in detail. FIG. 11 is a graph comparing distance from the point showing 10% of transmittance to the data line depending on the width of aperture on the data line in the LCD according to embodiments of the present invention with that in an LCD according to the prior art.

In FIG. 11, it can be seen that, as the width of aperture in the common electrode is increased, the point where the transmittance due to the light leakage becomes 10% in contrast with the front side white state is gradually closer to the data line. Thus, it is possible to decrease the width of BM formed to prevent the light leakage in the surrounding of the data line to an extent of 1 to 2 m.

Figure 12:
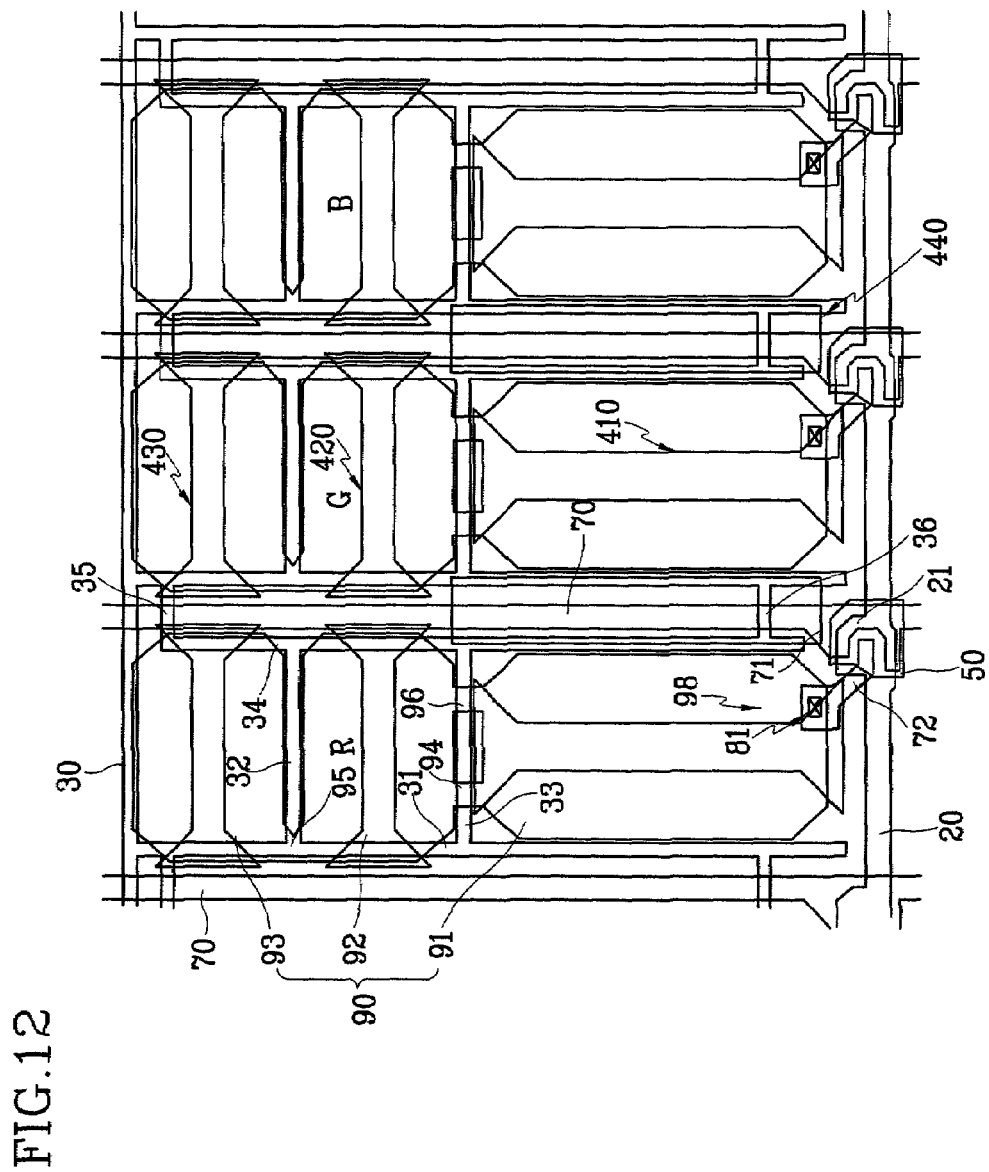
FIGS. 12 and 13 are layouts of a pixel electrode and a common electrode aperture when LCDs according to a third and a fourth embodiment of the present invention are seen at the front side, respectively.

Another embodiment capable of obtaining the above effects will be described. FIG. 12 is a layout of pixel electrode and common electrode apertures when an LCD according to a third embodiment of the present invention is seen at the front side.

As shown in FIG. 12, the structure of the LCD according to the third embodiment of the present invention is almost the same as that of the LCD and respective pixel areas according to the first embodiment of the present invention. However, it is different from the points that the pixel electrodes formed between the neighboring pixel areas are configured not to make 180 degree rotation symmetry but to repeat the same shape, and that the data line apertures 440 are disposed not on both sides of the second and the third apertures formed on the common electrode, but between the first aperture of the two neighboring pixel areas. The data line aperture 440 is disposed only between the first small parts 91 of the two neighboring pixel areas. The data line aperture 440 preferably overlaps the data lines as widely as possible; yet, since the common electrode isolated by the aperture may be generated in connection with the second and the third aperture, it is disposed only between the first small parts 91.

Figure 13:
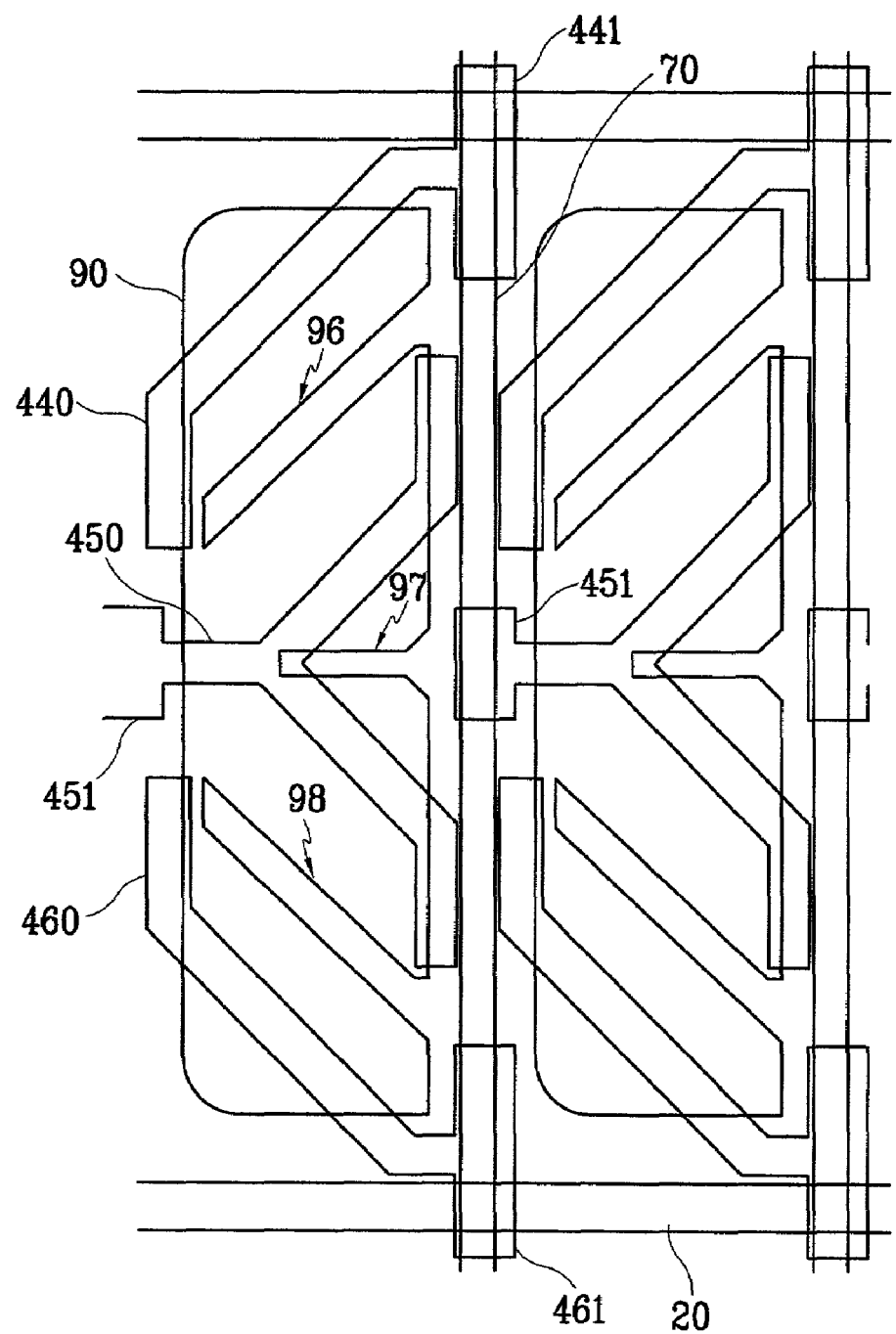

FIG. 13 is a layout of pixel electrode and common electrode apertures when an LCD according to a fourth embodiment of the present invention is seen at the front side. Seeing FIG. 13, a first aperture 97 hollowed thinly from right to left in the middle of a pixel electrode 90 of a rectangular shape is formed, and both of the entrances of the first aperture 97 are bent in a smoothing angle due to cutting the edges (hereinafter, referred to as "edge-cut"). When the pixel electrode 90 is divided into upper side and lower side centering around the first aperture 97, a second and a third aperture 96 and 98 are formed on the upper and the lower sides, respectively. The second and the third apertures 96 and 98 dig the upper side and the lower side in a diagonal direction, respectively, and form symmetry with each other. The second and the third apertures 96 and 98 dig in the same direction as the first aperture 97, and are closer to the first aperture 97 while digging.

A stem portion formed in a transverse direction, and a first and a second branch portion extending above and below in a diagonal direction from the stem portion, and a fourth aperture 450 including a first and a second branch end portion extending above and below in a longitudinal direction from the first and the second branch portion, respectively, are formed in the common electrode. Also formed in the common electrode are a central portion formed in a diagonal direction in parallel with the first branch portion, a transverse end portion extending in a transverse direction from the central portion, a fifth aperture 440 including a longitudinal end portion extending in a longitudinal direction from the central portion, and a sixth aperture 460 making symmetry with the fifth aperture with respect to the fourth aperture 440. Here, the data line apertures 451, 441 and 461 are connected to the stem portion of the fourth aperture 450 and the transverse end portions of the fifth and the sixth apertures 440 and 460, respectively. The fourth, the fifth and the sixth apertures 450, 440 and 460 having such a structure are formed in the common electrode repeatedly.

The first to the third apertures 96, 97 and 98 of the pixel electrode and the fourth to the sixth apertures 450, 440 and 460 overlap to divide the pixel electrode into a plurality of areas. Here, The first to the third apertures 96, 97 and 98 of the pixel electrode and the fourth to the sixth apertures 450, 440 and 460 are disposed alternately. The first to the sixth apertures 96, 97, 98, 450, 440 and 460 are formed parallel with one another in most areas excepting the stem portion of the first aperture 96 and the fourth aperture 450 dividing the center of the pixel electrode 90, the branch end portion of the fourth aperture 450 overlapping the side of the pixel electrode 90, and the transverse end portion and the longitudinal end portion of the second and the third apertures 97 and 98. The data line apertures 451, 441 and 461 connected to the fourth through sixth apertures 450, 440 and 460 overlap the data line 70.

The effect of the third and the fourth embodiments is the same as that of the first and the second embodiments. That is, the load of wires decreases, a variation amount of the liquid crystal capacitance developed in a wire is reduced, the light leakage by the cross talk of side is reduced, and the aperture ratio increases.

Although the present invention has been described with reference to preferred embodiments, it will be understood by those of ordinary skill in the pertinent art that a variety of changes and modifications may be made therein without departing from the scope and the spirit of the present invention as set forth in the following claims. In particular, there are a variety of modifications in the alignment of the apertures disposed between the pixel electrode and the common electrode. For example, it is possible to dispose projections, and not to form apertures.

As above, it is possible to decrease the load of wire, to reduce a variation amount of the liquid crystal capacitance developed in the wire, to decrease the light leakage due to cross talk of side, and to increase the aperture ratio by removing the common electrode on the data line to form the data line aperture. Decreasing the load of the wires results in implementing an LCD having a large panel and a high resolution by overcoming the limits of size and resolution of structures where the data line is made of single layer of Cr. Reducing a variation amount of the liquid crystal capacitance results in increasing the limit for the charging ratio due to improvement of cross talk properties in longitudinal lines generated first of all at low charging ratio. Decreasing the light leakage of sides due to cross talk and increasing the aperture ratio result in obtaining an LCD of an improved high quality.

What is claimed is:

1. A liquid crystal display, comprising:
   a first insulating substrate;
   a first wire formed on the first substrate;
   a second wire formed on the first substrate, insulated with, and intersecting the first wire;
   a pixel electrode formed on each of a plurality of pixel areas defined by the intersection of the first wire and the second wire and having a plurality of small parts and a connecting portion for connecting the plurality of small parts;
   a thin film transistor connected to the first wire, the second wire and the pixel electrode;
   a second insulating substrate disposed opposite to the first substrate; and
   a common electrode formed on the second substrate and having a dividing means dividing the plurality of small parts of the pixel electrode into a plurality of small domains and having a wire aperture overlapping the second wire, wherein the wire aperture and the dividing means each have a non-zero length and a non-zero width, the length direction of the wire aperture is different from the length direction of the dividing means, and the whole length of the wire aperture overlaps the second wire.

2. The liquid crystal display of claim 1, wherein the first domain dividing means is an aperture belonging to the pixel electrode and the second domain dividing means is an aperture belonging to the common electrode.

3. The liquid crystal display of claim 2, wherein the second domain dividing means and the second wire make 180-degree rotation symmetry between two pixel areas neighboring interposing the second wire.

4. The liquid crystal display of claim 3, wherein the second domain dividing means comprises a left and right domain dividing means for dividing the pixel electrode into left and right and an above and below domain dividing means for dividing the pixel electrode into above and below, and the second wire aperture is connected to both ends of the above and below domain dividing means.

5. A panel for the liquid crystal display of claim 4, wherein a space between the two neighboring second wires is varied repeatedly by a specific length, and sides adjacent to the second wire of the pixel electrode are bent with the pattern of the second wire to make the pixel electrode have a narrow width and a wide width.

6. A liquid crystal display comprising:
a first insulating substrate;
a gate wire including a gate line formed extending in a transverse direction on the first substrate and a gate electrode connected with the gate line;
a gate-insulating layer formed on the gate wire;
a channel portion semiconductor layer formed on the gate-insulating layer over the gate electrode;
an ohmic contact layer formed on the channel portion semiconductor layer and divided into both sides centering around the gate electrode;
a data wire including a source electrode and a drain electrode formed on the ohmic contact layer and a data line connected with the source electrode;
a passivation layer formed on the data wire and a contact hole for exposing the drain electrode;
a pixel electrode formed on the passivation layer and connected with the drain electrode through the contact hole, and comprising several small parts and a connecting portion for connecting the small parts;
a second insulating substrate disposed opposite to the first substrate;
a color filter formed on the second substrate; and
a common electrode covering the color filter and having a dividing aperture dividing the respective small parts of the pixel electrode into small domains and a data line aperture extending along the data line on the data line.

7. The liquid crystal display of claim 6, further comprising a storage capacitor wire formed in the same layer as the gate wire on the first substrate,
wherein, the respective small parts of the pixel electrode have longer sides and shorter sides parallel with the gate line or the data line, and the storage capacitor wire is disposed among the data line and the longer sides of the respective small parts adjacent thereto.

8. The liquid crystal display of claim 7, wherein the storage capacitor wire overlaps the shorter sides of the respective small parts of the pixel electrode adjacent to the data line.

9. The liquid crystal display of claim 7, wherein the dividing aperture and the data line aperture make 180-degree rotation symmetry with each other between the two pixel areas neighboring and interposing the data line.

10. A panel for the liquid crystal display of claim 9, wherein a space between the two neighboring second wires is varied repeatedly by a specific length, and sides adjacent to the second wire of the pixel electrode are bent with the pattern of the second wire to make the pixel electrode have a narrow width and a wide width.

11. A liquid crystal display, comprising:
a first layer;
a first signal pathway formed on the first layer;
a second signal pathway formed on the first layer and intersecting the first pathway wherein the second pathway is insulated with the first pathway;
a pixel electrode formed on one of a plurality of pixel areas defined by the intersection of the first pathway with the second pathway and having a plurality of small parts and a connecting portion for connecting the plurality of small parts;
a thin film transistor coupled to each of the first pathway, the second pathway and the pixel electrode;
a second layer disposed opposite the first layer;
a common electrode formed on the second layer having a first aperture overlapping the first pathway, a second aperture overlapping the second pathway, and a dividing means dividing the plurality of small parts of the pixel electrode into a plurality of small domains wherein the first aperture and the dividing means each have a non-zero length and a non-zero width, the length direction of the first aperture is different from the length direction of the dividing means, and the whole length of the second aperture overlaps the second signal pathway; and
a liquid crystal layer disposed between the first layer and the second layer.

12. A liquid crystal display as defined in claim 11, further comprising:
a second pixel electrode formed on a second one of the plurality of pixel areas defined by the intersection of the first pathway with the second pathway; and
a second thin film transistor coupled to each of the first pathway, the second pathway and the second pixel electrode.

13. A liquid crystal display as defined in claim 12 wherein the one and the second one of the plurality of pixel areas defined by the intersection of the first pathway with the second pathway are comprised by a bottle shape.

14. A liquid crystal display as defined in claim 12 wherein the one and the second one of the plurality of pixel areas defined by the intersection of the first pathway with the second pathway are formed with 180-degree rotation symmetry.

15. A method of forming a liquid crystal display, the method comprising:
providing a first insulation layer;
forming a first signal pathway on the first layer;
forming a second signal pathway on the first layer that intersects the first pathway;
disposing a pixel electrode on one of a plurality of pixel areas defined by the intersection of the first pathway with the second pathway and having a plurality of small parts and a connecting portion for connecting the plurality of small parts;

coupling a thin film transistor to each of the first pathway, the second pathway and the pixel electrode;

providing a second insulating layer opposite the first layer;

disposing a common electrode on the second layer with a first aperture overlapping the first pathway, a second aperture overlapping the second pathway, and a dividing means dividing the plurality of small parts of the pixel electrode into a plurality of small domains wherein the first aperture and the dividing means each have a non-zero length and a non-zero width, the length direction of the first aperture is different from the length direction of the dividing means, and the whole length of the second aperture overlaps the second signal pathway; and disposing a liquid crystal layer between the first layer and the second layer.

16. A method as defined in claim 15, further comprising:
disposing a second pixel electrode on a second one of the plurality of pixel areas defined by the intersection of the first pathway with the second pathway; and
coupling a second thin film transistor to each of the first pathway, the second pathway and the second pixel electrode.

17. A method as defined in claim 16 wherein the one and the second one of the plurality of pixel areas defined by the intersection of the first pathway with the second pathway are comprised by a bottle shape.

18. A method as defined in claim 16 wherein the one and the second one of the plurality of pixel areas defined by the intersection of the first pathway with the second pathway are formed with 180-degree rotation symmetry.

19. A liquid crystal display manufacturing system, comprising:
first providing means for providing a first insulation layer;
first forming means for forming a first signal pathway on the first layer;
second forming means for forming a second signal pathway on the first layer that intersects the first pathway;
first disposing means for disposing a pixel electrode with a plurality of small parts and a connecting portion for connecting the plurality of small parts on one of a plurality of pixel areas defined by the intersection of the first pathway with the second pathway;
first coupling means for coupling a thin film transistor to each of the first pathway, the second pathway and the pixel electrode;
second providing means for providing a second insulating layer opposite the first layer;
second disposing means for disposing a common electrode on the second layer with a first aperture overlapping the first pathway, a second aperture overlapping the second pathway, and a dividing means dividing the plurality of small parts of the pixel electrode into a plurality of small domains wherein the first aperture and the dividing means each have a non-zero length and a non-zero width, the length direction of the first aperture is different from the length direction of the dividing means, and the whole length of the second aperture overlaps the second signal pathway; and third disposing means for disposing a liquid crystal layer between the first layer and the second layer.

20. A system as defined in claim 19, further comprising:
fourth disposing means for disposing a second pixel electrode on a second one of the plurality of pixel areas defined by the intersection of the first pathway with the second pathway; and
second coupling means for coupling a second thin film transistor to each of the first pathway, the second pathway and the second pixel electrode.

21. A method of forming a liquid crystal display, the method comprising:
providing a first insulating substrate;
forming a gate wire including a gate line extending in a transverse direction on the first substrate and a gate electrode connected with the gate line;
forming a gate-insulating layer on the gate wire;
forming a channel portion semiconductor layer on the gate-insulating layer over the gate electrode;
forming an ohmic contact layer on the channel portion semiconductor layer and divided into both sides centering around the gate electrode;
forming a data wire including a source electrode and a drain electrode on the ohmic contact layer and a data line connected with the source electrode;
forming a passivation layer on the data wire and a contact hole for exposing the drain electrode;
forming a pixel electrode on the passivation layer and connected with the drain electrode through the contact hole, the pixel electrode comprising several small parts and a connecting portion for connecting the small parts;
disposing a second insulating substrate opposite to the first substrate;
forming a color filter on the second substrate; and
forming a common electrode covering the color filter and having a dividing aperture dividing the respective small parts of the pixel electrode into small domains and a data line aperture extending along the data line on the data line.

22. A method as defined in claim 21, further comprising forming a storage capacitor wire in the same layer as the gate wire on the first substrate, wherein the respective small parts of the pixel electrode have longer sides and shorter sides parallel with the gate line or the data line, and the storage capacitor wire is disposed among the data line and the longer sides of the respective small parts adjacent thereto.

23. A method as defined in claim 22 wherein the storage capacitor wire overlaps the shorter sides of the respective small parts of the pixel electrode adjacent to the data line.

24. A method as defined in claim 22 wherein the dividing aperture and the data line aperture make 180-degree rotation symmetry with each other between the two pixel areas neighboring and interposing the data line.

25. A method as defined in claim 24 wherein a space between the two neighboring second wires is varied repeatedly by a specific length, and sides adjacent to the second wire of the pixel electrode are bent with the pattern of the second wire to make the pixel electrode have a narrow width and a wide width.

* * * * *